United States Patent [19]

Okada

[11] Patent Number: 5,701,290
[45] Date of Patent: Dec. 23, 1997

[54] CARRIAGE LOCKING MECHANISM FOR AN OPTICAL DISK DRIVE INCLUDING A YOKE MEMBER HAVING A NOTCH FORMED THEREON

[75] Inventor: Yasushi Okada, Hadano, Japan

[73] Assignee: Ricoh Company, Ltd., Tokyo, Japan

[21] Appl. No.: 695,544

[22] Filed: Aug. 12, 1996

Related U.S. Application Data

[63] Continuation of Ser. No. 336,786, Nov. 9, 1994, abandoned.

[30] Foreign Application Priority Data

Nov. 9, 1993 [JP] Japan .................. 5-302214

[51] Int. Cl.⁶ .................................................. G11B 17/04
[52] U.S. Cl. .................................................. 369/263; 369/244
[58] Field of Search .................. 360/105; 369/244, 369/215, 263, 77.2, 257

[56] References Cited

U.S. PATENT DOCUMENTS

| | | | |
|---|---|---|---|
| 4,987,506 | 1/1991 | Uehara | 369/105 |
| 5,008,876 | 4/1991 | Nakagishi | 369/244 |
| 5,012,462 | 4/1991 | Tsujita | 369/77.1 |
| 5,060,101 | 10/1991 | Isomura | 360/105 |
| 5,063,557 | 11/1991 | Takamatsu et al. | 369/244 |
| 5,267,227 | 11/1993 | Nanke | 369/77.1 |
| 5,278,819 | 1/1994 | Shimegi et al. | 369/215 |
| 5,444,690 | 8/1995 | Childers, III et al. | 369/263 |

FOREIGN PATENT DOCUMENTS

| | | | |
|---|---|---|---|
| 63-83982 | 4/1988 | Japan | 369/244 |
| 1-130328 | 5/1989 | Japan | 369/244 |
| 2267785 | 11/1990 | Japan . | |
| 4-137288 | 5/1992 | Japan | 369/244 |

*Primary Examiner*—Stuart S. Levy
*Assistant Examiner*—Brian E. Miller
*Attorney, Agent, or Firm*—Cooper & Dunham LLP

[57] ABSTRACT

In an optical disk drive for recording and reproducing data out of an optical disk, a carriage locking mechanism has an engaging member which is rotatable in a plane parallel to a base member. This reduces the space occupied by the engaging member in the direction of height of the base member. As a result, the overall thickness of the disk drive is successfully reduced. Moreover, since a notch is located at a position where the engaging member interferes with a yoke member, the height of the disk drive is further reduced.

24 Claims, 5 Drawing Sheets

CARRIAGE LOCKING MECHANISM FOR AN OPTICAL DISK DRIVE INCLUDING A YOKE MEMBER HAVING A NOTCH FORMED THEREON

This is a division of application Ser. No. 08/336,786 field Nov. 9, 1994 now abandoned.

BACKGROUND OF THE INVENTION

The present invention relates to an optical disk drive for recording and reproducing data out of an optical disk and, more particularly, to a mechanism for locking a carriage which moves an optical pick-up included in the disk drive.

In an optical disk drive, an optical pick-up for recording and reproducing data out of an optical disk is mounted on a carriage and moved back and forth in the radial direction of the disk. While power is not supplied to a seeking mechanism which drives the carriage, the carriage is freely movable and, therefore, apt to damage the pick-up and other constituents arranged in the disk drive when an unexpected shock or impact acts on the disk drive.

In light of the above, it has been customary to provide the disk drive with a carriage locking mechanism for locking the carriage when a power source is not turned on. For example, Japanese Patent Laid-Open Publication No. 2-267785 teaches a carriage locking mechanism having a guide shaft between a carriage and a holder for holding a disk cartridge. A plate supported by the guide shaft and the carriage are each formed with a lug for engagement. When a disk cartridge is not loaded, the holder causes the plate to rotate until the lug of the plate and that of the carrier engage with each other, thereby locking the carriage in position. Such a conventional mechanism locks and unlocks the carriage by using the force of the holder which is movable in association with the loading and unloading of a disk cartridge and, therefore, does not need an exclusive drive source (e.g., solenoid) for locking the carriage. This successfully reduces the size and cost of the disk drive. However, the guide shaft intervening between the carriage and the holder increases the overall height of the disk drive, obstructing the miniaturization, particularly reduction in thickness, of the disk drive.

SUMMARY OF THE INVENTION

It is, therefore, an object of the present invention to provide a carriage locking mechanism capable of reducing the overall thickness of an optical disk drive.

It is another object of the present invention to provide a carriage locking mechanism for an optical disk drive which does not need an exclusive drive source.

In accordance with the present invention, a mechanism for locking a carriage which moves an optical pick-up for recording and reproducing data out of an optical disk has a holder member for holding a disk cartridge, accommodating an optical disk therein, and movable back and forth in interlocked relation to the loading and unloading of the disk cartridge in a loading and unloading direction, a carrier member for moving the holder member, a base member accommodating at least the holder member, a connecting device for connecting the holder member and carrier member and for locking the holder member and carrier member in a predetermined position of the base member, an engaging member supported by the base member to be rotatable in a plane parallel to the holder member and interlocked with the carrier member, the engaging member engaging with the carriage when the holder member is located at a predetermined non-loading position or releasing the carriage when the holder member is located at a predetermined loading position, a guide member included in the base member for guiding the engaging member in the movable range of the engaging member, and a biasing member for biasing the engaging member toward the guide member.

Also, in accordance with the present invention, an optical disk drive has an optical pick-up for recording and reproducing data out of an optical disk, a carriage for moving the optical pick-up, and a carriage locking mechanism for locking the carriage in position. The carriage locking mechanism has a holder member for holding a disk cartridge, accommodating an optical disk therein, and movable back and forth in interlocked relation to the loading and unloading of the disk cartridge in a loading and unloading direction, a carrier member for moving the holder member, a base member accommodating at least the holder member, a connecting device for connecting the holder member and carrier member and for locking the holder member and carrier member in a predetermined position of the base member, an engaging member supported by the base member to be rotatable in a plane parallel to the holder member and interlocked with the carrier member, the engaging member engaging with the carriage when the holder member is located at a predetermined non-loading position or releasing the carriage when the holder member is located at a predetermined loading position, a guide member included in the base member for guiding the engaging member in the movable range of the engaging member, and a biasing member for biasing the engaging member toward the guide member.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
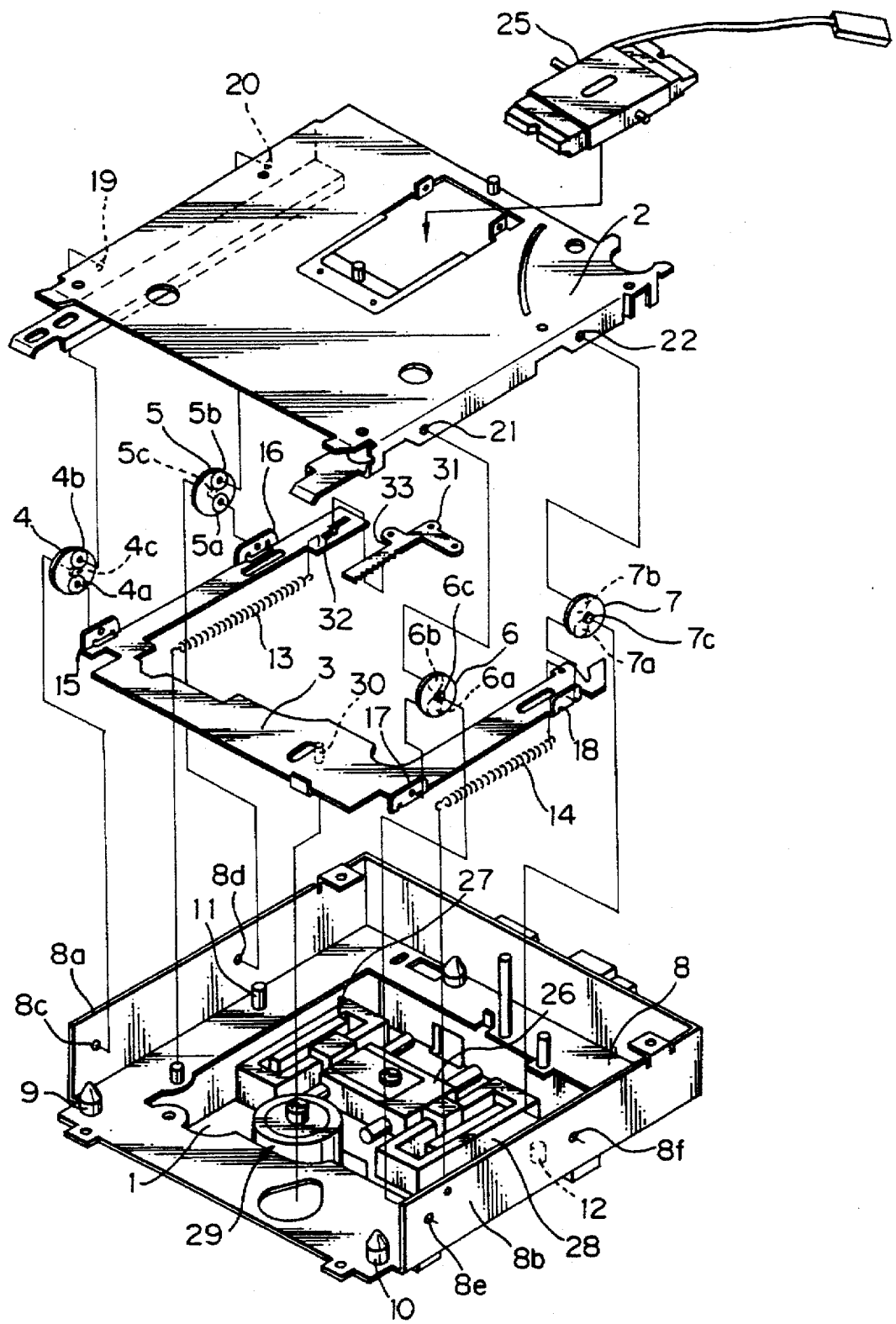
FIG. 1 is a fragmentary perspective view of a disk loading device to which a carriage locking mechanism embodying the present invention is applied.

Referring to FIG. 1 of the drawings, a disk loading device is shown to which an optical disk drive in accordance with the present invention is applied. As shown, the disk drive includes a base 1, a holder 2 for accommodating an optical disk cartridge, which will be described, and a frame-like carrier 3 movable back and forth in a direction for loading and unloading the disk cartridge. Cams 4, 5, 6 and 7 connect the carrier 3 to the holder 2 and cause the holder 2 to move in interlocked relation to the carrier 3 in the abovementioned direction. The cams 4–7 are fixed in place by a loading base 8. These constituent parts 2–8 are mounted on the base 1 and constitute the disk loading device in combination.

Reference pins 9, 10, 11 and 12 stand upright on the loading base 8 in order to define the height of the disk cartridge. Springs 13 and 14 are each anchored at one end to the loading base 8 and at the other end to the carrier 3, so that the carrier 3 is constantly biased in an ejecting direction. The carrier 3 has raised portions 15, 16, 17 and 18 at opposite edges thereof. The cams 4–7 respectively have a pair of actuating stubs 4a and 4b, a pair of actuating stubs 5a and 5b, a pair of actuating stubs 6a and 6b, and a pair of actuating stubs 7a and 7b. The stubs 4a, 5a, 6a and 7a are engaged with the cams 4–7, respectively. The other stubs 4b, 5b, 6b and 7b are respectively received in holes 19, 20, 21 and 22 formed through the holder 2. Stubs 4c, 5c, 6c and 7c are respectively formed on the surfaces of the cams 4–7 opposite to the surfaces where the stubs 4a–7b are positioned. The stubs 4c–7c are respectively received holes 8c, 8c, 8e and 8f formed through opposite side walls 8a and 8b which rise from the edges of the loading base 8. In this configuration, the cams 4–7 are rotatably mounted on the loading base 8 while connecting the holder 2 and carrier 3 to each other. Further, the holder is allowed to move only in a direction as restricted by the cams 4–7.

The holder 2 is generally configured in such a manner as to embrace the disk cartridge from above and opposite sides. The opposite sides of the holder 2 are bent downward at portions adjoining a disk cartridge inlet. A magnetic head 25 is mounted on the top of the holder 2 in order to generate an auxiliary magnetic field.

Arranged on the base 1 are a carriage 26, a pair of moving coil type linear motors 27 and 28, and a spindle motor mechanism 29. The carriage 26 accommodates the object lens assembly of an optical pick-up. The linear motors 27 and 28 constitute a seeking mechanism for moving the carriage 26 in the radial direction of an optical disk, not shown. The spindle motor mechanism 29 fixes the disk in place and causes it to spin.

An eject pin 30 is studded on the front underside of the carrier 3 while an engaging member 31 is positioned in the rear portion of the carrier 3 for locking the carriage 26 in place. The engaging member 31 is rotatably mounted on the loading base 8. A roller 33 is mounted on the engaging member 31 and received in a cam hole 32 formed in the carrier 3.

Figure 2:
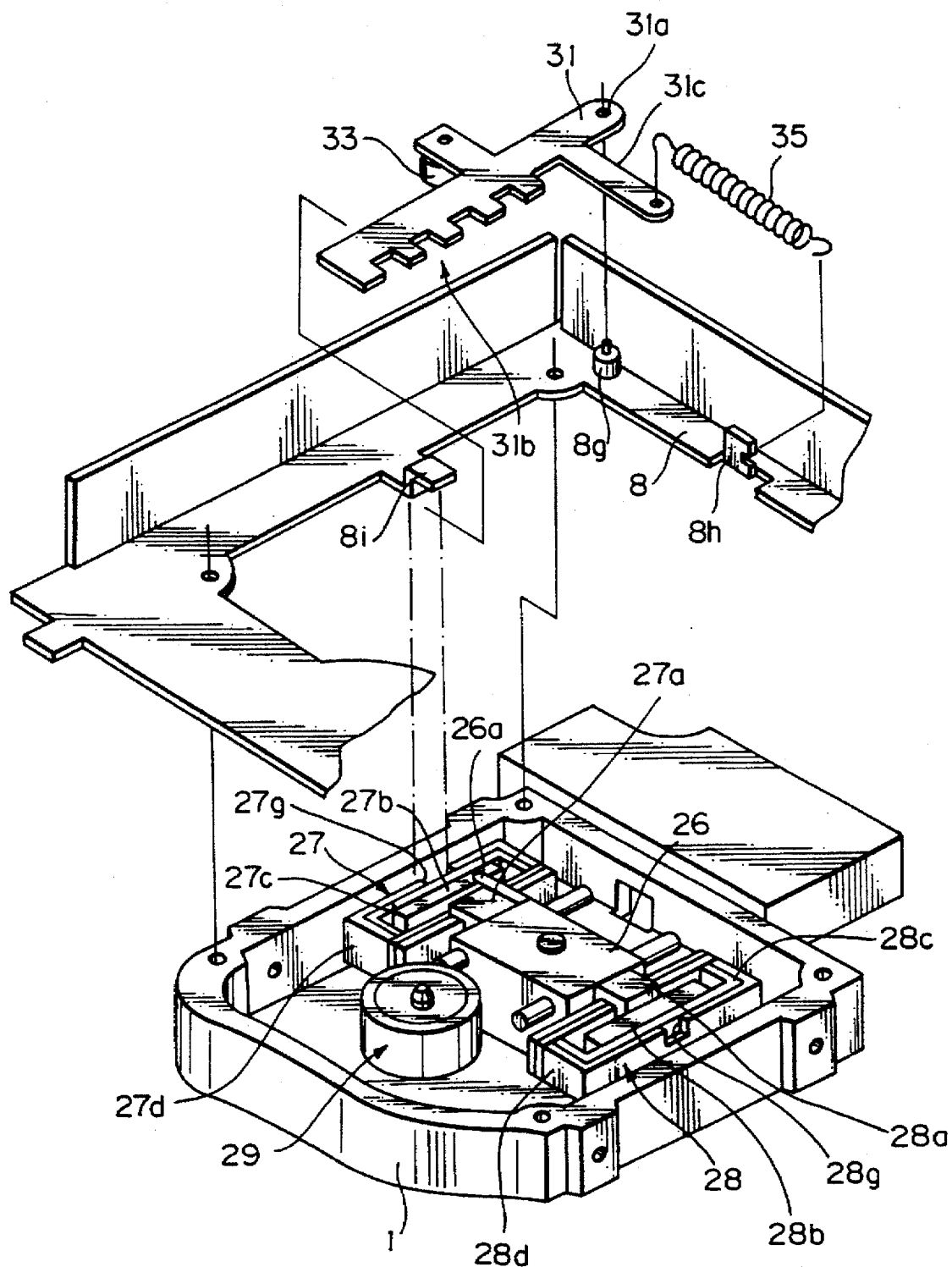
FIG. 2 is a fragmentary exploded perspective view of the carriage locking mechanism.
Figure 3:
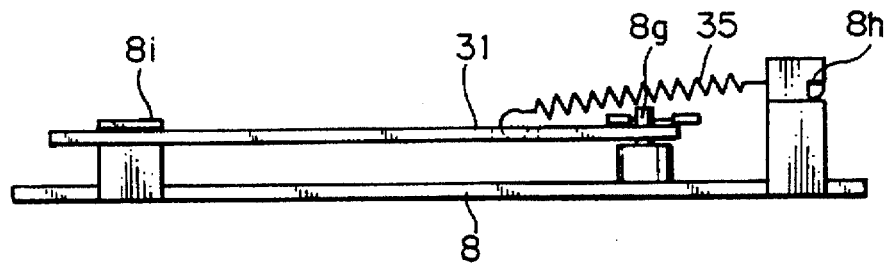
FIG. 3 is a fragmentary side elevation of the carriage locking mechanism.

FIGS. 2 and 3 show the carriage locking mechanism, including the engaging member 31, in fragmentary views. As shown, the engaging member 31 implemented as a rectangular flat member and formed with a hole 31a at one end thereof. A pin 8g is studded on the loading base 8 and received in the hole 31a of the engaging member 31. In this condition, the engaging member 31 is rotatable about the pin 8g. The engaging member 31 is formed with teeth 31b along one edge thereof at the end portion remote from the hole 31a. An arm 31c extends out from the engaging member 31 at the same side as the teeth 31b and in the vicinity of the hole 31a. The arm 31c is perpendicular to the general extension of the engaging member. A spring 35 is anchored at one end to the arm 31c and at the other end to a retaining portion 8h included in the loading base 8. The spring 35 constantly biases the engaging member 31 such that the teeth 31b thereof mate with the carriage 26.

The loading base 8 has a guide 8i for receiving the edge of the engaging member 31 opposite to the teeth 31b and for positioning the member 31 in the up-and-down direction. As shown in FIG. 3, the position where the spring 35 is anchored to the retaining portion 8h is higher in level than the portion where it is anchored to the engaging member 31. Hence, the engaging member 31 is also subjected to a force biasing it upward. Therefore, the engaging member 31 is rotatable about the pin 8g only in a plane defined by the guide 8i.

Figure 5:
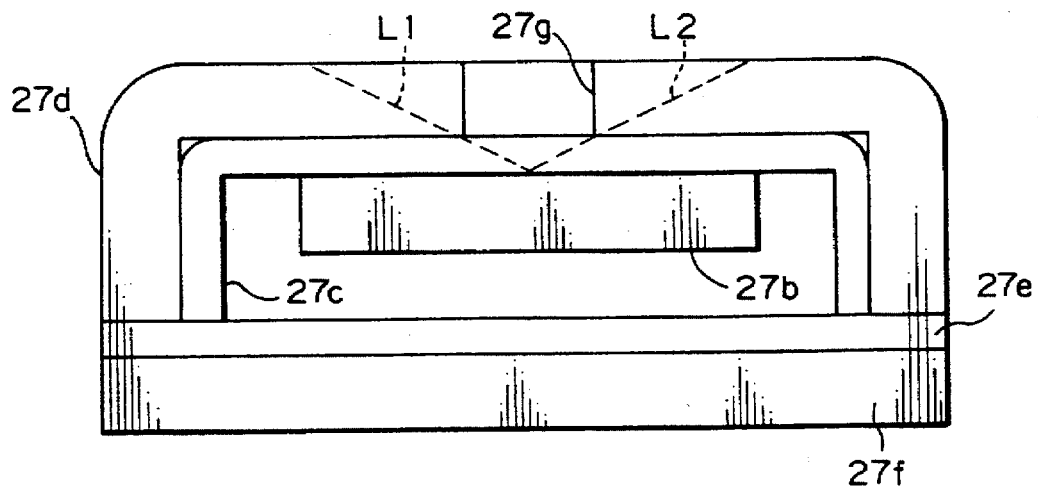
FIG. 5 shows the position and dimension of a notch included in the carriage locking mechanism.

The linear motor 27 has a drive coil 27a affixed to the carriage 26, a permanent magnet 27b, an inner yoke member 27c for attracting the magnet 27b, an outer yoke member 27d being attracted by the inner yoke member 27c, a yoke member 27e (see FIG. 5) passed through the drive coil 27a and being attracted by the ends of the inner yoke member 27c, and a yoke member 27f (see FIG. 5) being attracted by the yoke member 27e. Likewise, the other linear motor 28 has a drive coil 28a, a permanent magnet 28b, an inner yoke member 28c, an outer yoke member 28c, a yoke member 28e (see FIG. 5), and a yoke member 28f (see FIG. 5) which are identical with those of the linear motor 28. The outer yoke members 27d and 28d each has a notch 27g or 28g corresponding in position to the intermediate portion of the associated permanent magnet 27b or 28b. The guide 8i of the loading base 8 is received in the notch 27g of the outer yoke member 27d. An arm 26a extends out from the carriage 26 sideways at substantially the same level, or height, as the drive coil 27a and at a position where it is engageable with the engaging member 31.

Figure 4:
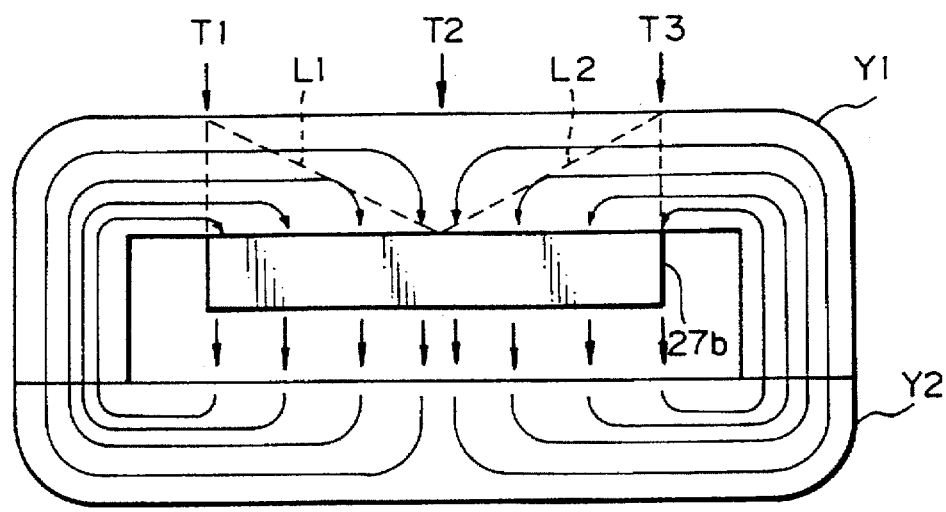
FIG. 4 shows a magnetic circuit generated by a motor.

The notch 27g of the outer yoke member 27d, for example, will be described specifically. FIG. 4 shows a magnetic circuit associated with the permanent magnet 27b of the linear motor 27. In the figure, a yoke Y1 represents the inner yoke member 27c and outer yoke member 27d while a yoke Y2 represents the yoke members 27e and 27f. As shown, magnetic fluxes issuing from the magnet 27b enter the yoke member Y2 perpendicularly thereto, separate in the right-and-left direction, propagate through the yoke member Y2, enter the yoke member Y1 from opposite sides, and then return to the magnet 27b via the yoke Y1. Taking the left portion of the yoke member Y1 as an example, the flux from the end T1 of the magnet 27b returns to the magnet 27b little by little while the flux from the center T2 entirely returns to the magnet 27b. Hence, considering the path extending from the position T1 to the position T2, the flux density of the flux passing through the yoke Y1 sequentially decreases and becomes substantially zero at the position T2.

The flux density of the flux which can pass through the yoke member Y1 has an upper limit (up to saturation flux density). Therefore, assuming that the yoke member Y1 has a given dimension in height, the dimension required of the yoke member Y1 in the thicknesswise direction lies in a range extending linearly from the initial thickness (position T1) to the zero thickness (position T2), as indicated by a dashed line L1 in FIG. 4. Likewise, considering the right portion of the yoke member Y1, the dimension required of the yoke member Y1 in the thicknesswise direction lies in a range extending linearly from the initial thickness (position T3) to the zero thickness (position T2), as indicated by a dashed line L2 in FIG. 4.

It will be seen from the above that the intermediate portion of the yoke member Y1 can have the thicknesswise dimension thereof reduced up to the positions indicated by the dashed lines L1 and L2 in FIG. 4. Specifically, the generally V-shaped portion of the yoke member Y1 delimited by the lines L1 and L2 can be safely notched. It follows that the notch 27g can have any size and take any position so long as it is located outside of the lines L1 and L2. When the notch 27g is not located outside of the range delimited by the lines L1 and L2, fluxes will leak. In such a case, it is necessary to increase the magnetic force of the magnet or to increase the number of turns of the drive coil in order to achieve a sufficient driving force with the motor 27. Each motor 27 and 28 has a double yoke structure that achieves the thickness required of the yoke members by combining existing sheet metal.

Figure 6:
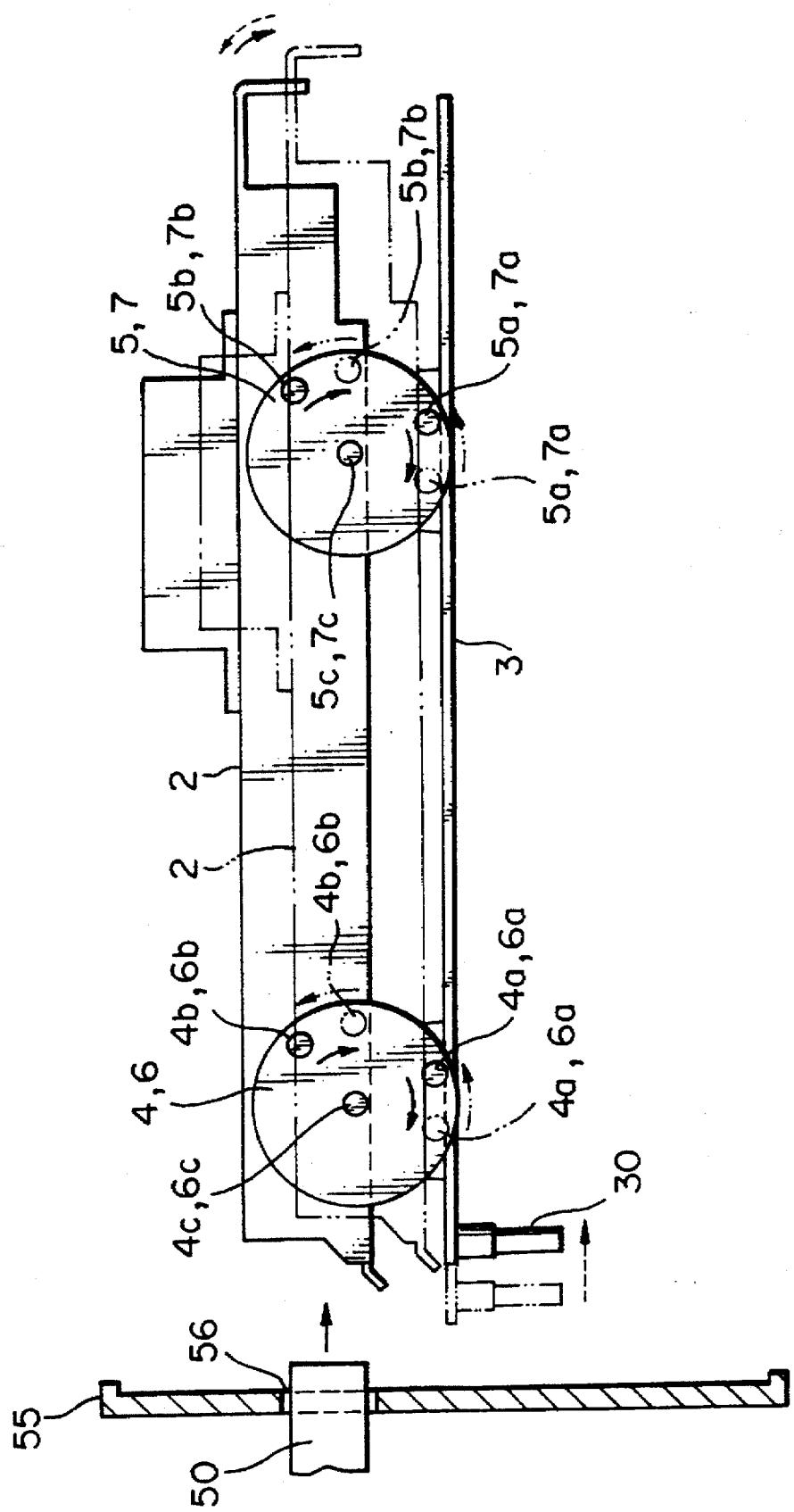
FIG. 6 demonstrates the movement of a holder and that of a carrier also included in the carriage locking mechanism.
Figure 7:
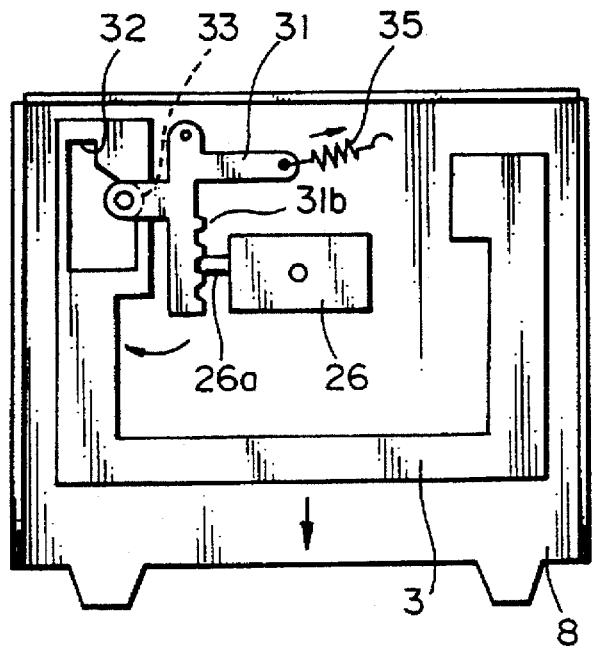
FIG. 7 shows the carriage locking mechanism in a condition wherein a disk cartridge is not loaded.

The operation of the carriage locking mechanism will be described hereinafter. As shown in FIG. 6, when the holder 2 is not loaded with an optical disk cartridge 50, the forces of the springs 13 and 14 are overcome by a locking mechanism, not shown. In this condition, the stubs 4b–7b of the cams 4–7 are located at their uppermost positions, as indicated by solid lines in the figure. The inlet of the holder 2 for receiving the cartridge 50 is flush with an insertion slot 56 formed through a front panel 55 which is located at the front of the base 1. Since the carriage 3 is located at the rearmost position thereof, the roller 33 of the engaging member 31 is positioned at the innermost part of the cam hole 32, as shown in FIG. 7. Hence, the engaging member 31 is rotated in the direction in which the force of the spring 35 acts. At this instant, the guide 8i positions the engaging member 31 at the same level at the arm 26a of the carriage 26. As a result, the teeth 31b of the engaging member 31 mate with the arm 26a of the carriage 26, thereby locking the carriage 26 in position.

Assume that the disk cartridge 50 is inserted into the holder 2 beyond a predetermined position. Then, a mechanism, not shown, cancels the retention of the locking mechanism acting on the springs 13 and 14, so that the carrier 3 is moved in the ejecting direction. This causes the stubs 4a–7a of the cams 4–7 to rotate clockwise, as seen in FIG. 6, since a force acts thereon in the ejecting direction due to the movement of the carrier 3. The stubs 4a–7a, moved to their lowermost positions, locate the holder 2 at the lowermost or loading position thereof, shown in phantom in FIG. 6. In this manner, when the cartridge 50 is inserted into the holder 2, the carrier 3 is moved in the ejecting direction while the holder 2 is moved along a substantially arcuate locus, thereby locating the cartridge 50 at a predetermined position.

Figure 8:
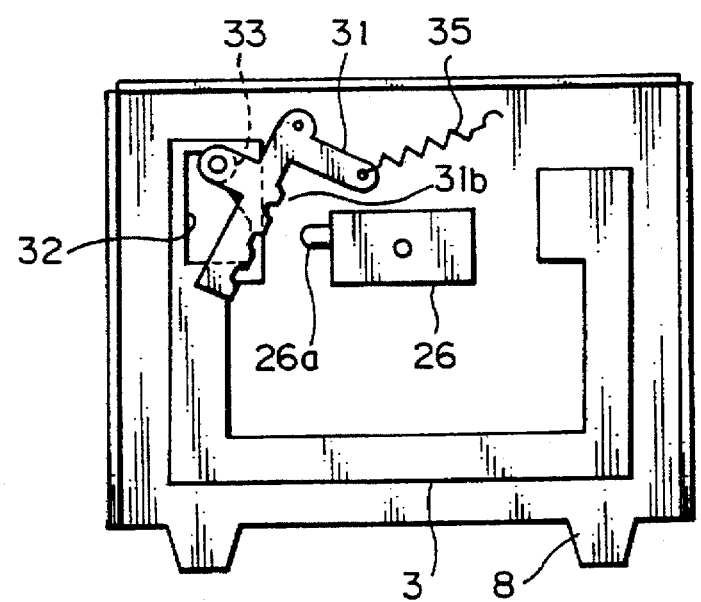
FIG. 8 shows the carriage locking mechanism in a condition wherein a disk cartridge is loaded.

Further, in the above condition, the operating surface of the head 40 adjoins the recording surface of an optical disk received in the disk cartridge 50. At the same time, as shown in FIG. 8, the roller 33 of the engaging member 33 rolls within the cam hole 32 and reaches the outermost part of the hole 32 when the carrier 3 ends the movement thereof. Such a movement of the roller 33 causes the engaging member 31 to rotate in the opposite direction against the action of the spring 35. As a result,the teeth 31b of the engaging member are released from the arm 26a of the carriage 26, rendering the carriage 26 freely movable.

To eject the cartridge 50, an eject button, not shown, is pressed. An ejecting mechanism is operatively connected to eject button and moves the eject pin 30 in the direction opposite to the ejecting direction. The carrier 3 is moved in the same direction as the eject pin 30 against the action of the springs 13 and 14. As a result, the cams 4–7 are rotated counterclockwise, as viewed in FIG. 6, causing the holder 2 to sequentially rise. When the holder 2 reaches the uppermost position, the loading mechanism restores the original position.

As stated above, in the illustrative embodiment, the carriage 26 is locked by the carriage locking mechanism when the disk cartridge 50 is not loaded, but it is unlocked when the cartridge 50 is loaded.

Since the engaging member 31, constituting the carriage locking mechanism, moves in a plane parallel to the loading base 8, the overall thickness of the disk drive can be reduced. Further, since the guide 8i maintains the engaging member 31 at the same level as the arm 26a of the carriage 26, the teeth 31b of the member 31 can surely mate with the arm 26a. In addition, since the guide 8i is received in the notch 27 of the outer yoke member 27b, it is possible to reduce the height of the guide 8i. The guide 8i, therefore, does not increase the overall thickness of the disk drive.

The spring 35, pulling the engaging member 31 upward, allows the member 31 to be restricted stably in the up-and-down direction. Also, this section can be reduced in size.

While the embodiment has used linear motors as a drive source for a seeking mechanism, the present invention is similarly practicable with a rotation type motor. In such a case, with the rotation type motor, it is possible to reduce the thickness of a device for driving the carriage of an optical pick-up.

In summary, it will be seen that the present invention provides a carriage locking mechanism having an engaging member which is rotatable in a plane parallel to a base member. This reduces a region which a space necessary for the engaging member to move occupies in the direction of height of the base member. As a result, the overall thickness of an optical disk drive is successfully reduced. Moreover, since a notch is located at a position where the engaging member interferes with a yoke member, the dimension in the direction of height is further reduced.

Various modifications will become possible for those skilled in the art after receiving the teachings of the present disclosure without departing from the scope thereof.

What is claimed is:

1. An optical disk drive comprising:
    an optical pick-up for recording and reproducing data from an optical disk;
    a carriage for moving said optical pick-up;
    a seek motor for moving said carriage, said seek motor including a yoke member having a notch formed therein;
    a holder member for holding a disk cartridge having an optical disk therein, said holder member being movable back and forth in interlocked relation to the movement of said disk cartridge between loading and unloading positions;
    a carrier member for moving said holder member;
    a base member accommodating at least said holder member;
    connecting means for connecting said holder member and said carrier member and for locking said holder member and said carrier member in a predetermined position in relation to said base member; and
    carriage locking means for securing said carriage in relation to said base member at least when said holder member is in said unloading position, said carriage locking means including:
        an engaging member supported by said base member and rotatable in a plane parallel to said holder member, said engaging member movable between first and second positions in response to movement of said holder member and configured to move to the first position to engage and lock said carriage when said holder member is in said unloading position, and configured to move to the second position to release said carriage when said holder member is in said loading position;

a guide member associated with said base member and configured to position said engaging member such that said engaging member is aligned with said carriage at least when said holder member is in said unloading position, said guide member restricting movement of said engaging member in a direction normal to the plane parallel to said holder member, at least a portion of said guide member being provided within said notch formed in said yoke member of said seek motor; and biasing means for biasing said engaging member toward said guide member.

2. A disk drive as claimed in claim 1, wherein said carriage locking means further comprises a notch formed in a yoke member of a seek motor mounted on said base member for moving said carriage, said notch forming a position where said yoke member interferes with said guide member.

3. A disk drive as claimed in claim 2, wherein said yoke member includes an inner yoke member and an outer yoke member and said notch is located in said outer yoke member and at an intermediate portion with respect to a longitudinal direction of a permanent magnet member which attracts said outer yoke member.

4. The optical disk drive according to claim 1, wherein said biasing means moves said engaging member by rotating said engaging member in a direction toward said guide member.

5. The optical disk drive according to claim 1, wherein said biasing means biases said engaging member in a direction toward said guide member in a direction substantially perpendicular to said parallel plane.

6. The optical disk drive according to claim 1, wherein said guide member is integrally formed to said base member.

7. The optical disk drive according to claim 1, wherein said biasing member is configured to bias said engaging member toward said carriage.

8. An optical disk drive as claimed in claim 1, further comprising a magnet member which attracts the yoke member and forms flux lines through the yoke member, the flux lines having a flux density.

9. An optical disk drive as claimed in claim 8, wherein the notch is formed in a low flux density region of the yoke member.

10. An optical disk drive as claimed in claim 9, wherein the yoke member has a V-shaped low flux density region at the region the notch is formed.

11. An optical disk drive as claimed in claim 10, wherein a bottom of the "V" of the V-shaped low flux density region is located at a portion of the yoke member substantially corresponding to a center of the magnet member in the magnet member's lengthwise direction.

12. An optical disk drive as claimed in claim 8, wherein the notch is located at a position of the yoke member substantially corresponding to a center of the magnet in the magnet member's lengthwise direction.

13. A mechanism for locking an optical pick-up carriage of an optical disk drive having a disk cartridge holding member, a base member supporting the cartridge holding member, and a carrier member used to move the holding member, said mechanism comprising:

an optical pickup;

an optical pickup carriage for moving said optical pickup;

a seek motor for moving said optical pickup carriage, said seek motor including a yoke member having a notch formed therein;

an engaging member supported by the base member and configured for rotational movement in a plane parallel to the cartridge holding member between first and second positions, said engaging member being configured to move to the first position to engage and lock the optical pick-up carriage when the cartridge holding member is positioned at a predetermined non-loading position, and configured to move to the second position to release the optical pick-up carriage when the cartridge holding member is positioned at a predetermined loading position;

a guide member associated with the base member and provided to align said engaging member with the optical pick-up carriage at least when the holding member is in the non-loading position, said guide member restricting movement of the engaging member in a direction normal to the plane parallel to said cartridge holding member, at least a portion of said guide member being provided within said notch formed in said yoke member of said seek motor; and a biasing member configured to bias said engaging member toward said guide member so as to align said engaging member with the optical pick-up carriage.

14. A mechanism as claimed in claim 13, further comprising a notch formed in a yoke member of a seek motor mounted on said base member for moving said carriage, said notch forming a position where said yoke member interferes with said guide member.

15. A mechanism as claimed in claim 14, wherein said yoke member includes an inner yoke member and an outer yoke member and said notch is located in said outer yoke member and at an intermediate portion with respect to a longitudinal direction of a permanent magnet member which attracts said outer yoke member.

16. The mechanism according to claim 13, wherein said biasing member is configured to bias said engaging member toward the optical pick-up carriage.

17. The mechanism according to claim 13, wherein said biasing member moves said engaging member by rotating said engaging member in a direction toward said guide member.

18. The mechanism according to claim 13, wherein said biasing member biases said engaging member in a direction toward said guide member in a direction substantially perpendicular to said parallel plane.

19. The mechanism according to claim 13, wherein said guide member is integrally formed to the base member.

20. A mechanism as claimed in claim 13, further comprising a magnet member which attracts the yoke member and forms flux lines through the yoke member, the flux lines having a flux density.

21. A mechanism as claimed in claim 20, wherein the notch is formed in a low flux density region of the yoke member.

22. A mechanism as claimed in claim 21, wherein the yoke member has a V-shaped low flux density region.

23. A mechanism as claimed in claim 22, wherein a bottom of the "V" of the V-shaped low flux density region is located at a portion of the yoke member substantially corresponding to a center of the magnet member in the magnet member's lengthwise direction.

24. A mechanism as claimed in claim 20, wherein the notch is located at a position of the yoke member substantially corresponding to a center of the magnet in the magnet member's lengthwise direction.

* * * * *